US008234197B2

(12) United States Patent
Solberg et al.

(10) Patent No.: US 8,234,197 B2
(45) Date of Patent: *Jul. 31, 2012

(54) HIERARCHICAL TRANSACTION FILTERING

(75) Inventors: Eric L. Solberg, San Ramon, CA (US); Jacob Avital, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/092,782

(22) Filed: Apr. 22, 2011

(65) Prior Publication Data

US 2011/0196767 A1    Aug. 11, 2011

Related U.S. Application Data

(62) Division of application No. 10/426,474, filed on Apr. 29, 2003, now Pat. No. 7,958,026.

(51) Int. Cl.
*G06Q 40/00* (2012.01)
(52) U.S. Cl. ............................................ 705/35; 705/39
(58) Field of Classification Search ...................... 705/35
See application file for complete search history.

(56) References Cited

U.S. PATENT DOCUMENTS

| | | | | |
|---|---|---|---|---|
| 5,701,480 | A * | 12/1997 | Raz ............................... | 718/101 |
| 6,662,164 | B1 * | 12/2003 | Koppelman et al. ........ | 705/14.13 |
| 6,909,708 | B1 | 6/2005 | Krishnaswamy et al. | |
| 7,463,648 | B1 | 12/2008 | Eppstein et al. | |
| 2002/0087441 | A1 * | 7/2002 | Wagner et al. .................. | 705/30 |
| 2002/0133458 | A1 * | 9/2002 | Zhou et al. ....................... | 705/39 |
| 2002/0156719 | A1 | 10/2002 | Finebaum et al. | |
| 2002/0169678 | A1 | 11/2002 | Chao et al. | |
| 2002/0198984 | A1 * | 12/2002 | Goldstein et al. ............. | 709/224 |
| 2003/0004960 | A1 | 1/2003 | Pressmar | |
| 2003/0058277 | A1 * | 3/2003 | Bowman-Amuah .......... | 345/765 |
| 2003/0139997 | A1 | 7/2003 | Ginsberg | |
| 2003/0154423 | A1 * | 8/2003 | Egolf et al. ..................... | 714/15 |
| 2003/0225660 | A1 | 12/2003 | Noser et al. | |
| 2005/0138110 | A1 | 6/2005 | Redlich et al. | |
| 2006/0122881 | A1 | 6/2006 | Walker et al. | |
| 2007/0226027 | A1 * | 9/2007 | Chang et al. ..................... | 705/8 |
| 2008/0133415 | A1 | 6/2008 | Ginter et al. | |

OTHER PUBLICATIONS

Wall Street Computer Review: Third party alliance listing V6 n8, p. 27(14) May 1989 ISSN:0738-4343.*
Wall Street Computer Review: Third party alliance listings V6 n8,p. 27(14) May 1989 ISSN:0738-4343.

* cited by examiner

*Primary Examiner* — Shahid Merchant
*Assistant Examiner* — John Anderson
(74) *Attorney, Agent, or Firm* — Kilpatrick Townsend & Stockton LLP

(57) ABSTRACT

Systems and methods of allocating transactions among business objects are described. Allocation is accomplished using generated allocation rules that are generated using a hierarchical data structure representative of relationships between the business objects and using predefined rules that characterize the business objects. Each generated allocation rule is associated with at least one of the business objects and is used to query a set of transactions to be allocated. Query results, generated using a generated allocation rule, include the transactions to be allocated to the associated business object. Embodiments are disclosed to illustrate how the invention can be used to allocate sales commissions to members of a sales team. The invention is applicable to a variety of business objects including people, organizations, accounts, tasks, or the like.

20 Claims, 6 Drawing Sheets

HIERARCHICAL TRANSACTION FILTERING

CROSS-REFERENCES TO RELATED APPLICATIONS

This application is a divisional of U.S. application Ser. No. 10/426,474, filed Apr. 29, 2003, which is hereby incorporated by reference in its entirety for all purposes.

This application is related to U.S. application Ser. No. 10/691,941, filed Oct. 22, 2003 (issued Dec. 21, 2010 as U.S. Pat. No. 7,856,383), and U.S. application Ser. No. 12/247,931, filed Oct. 8, 2008 (issued Dec. 14, 2010 as U.S. Pat. No. 7,853,503), which are continuations-in-part of the aforementioned parent application.

BACKGROUND

1. Field of the Invention

The invention is in the field of computer science and more specifically in the field of transaction management.

2. Description of the Prior Art

In a typical organization, sale of a product or service can impact multiple parties. For example, in a business environment such transactions may involve a sales team, their supervisors, their supporters and post sale personnel. In some cases it is desirable to distribute credit (e.g., commissions) for a sale or responsibility for a purchase, among these parties.

Available software includes applications configured to track sales and distribute commissions to personnel within an organization. In these applications different personnel are assigned various allocation criteria for use in determining the transactions for which they should receive credit. For example, a sale may be associated with a specific sales territory, a specific product type, a sales team, an individual salesperson, a channel partner, a price range, a payment schedule, etc. Each of these characteristics may be associated with allocation criteria and used to determine one or more individuals who should receive credit for the sale.

In a typical prior art application, each transaction is individually examined and its characteristics are compared with each person's allocation criteria. When the characteristics match the criteria, the person receives some credit for the transaction. The amount of credit is typically dependent on the allocation criteria. In large organizations, these comparisons may include thousands of transactions and hundreds of personnel. The total number of comparisons is, therefore, large.

Previously available systems have a number of drawbacks. For example, since each transaction is individually examined, the performance of these systems responds poorly to increases in transaction volume. In addition, setup and maintenance of prior art systems are difficult since each person's allocation criteria is manually defined. Likewise, changes in products, personnel or organization structure can require, possibly extensive, modification of system data. For example, when a new product is introduced the allocation criteria relating to each person who may receive credit for a sale of the product may need to be modified before an appropriate credit can be assigned. Finally, in existing systems, the ways in which credits are assigned can be unclear to personnel tracking or expecting to receive commissions. These systems do not lend themselves well to the generation of reports that itemize the commissions due to each person.

There is a need for systems and methods to more efficiently manage allocation of transactions, such as sales commissions. For example, there would be a benefit to—having systems capable of processing large numbers of transactions more efficiently, automating aspects of allocation criteria management, or more clearly showing to a sales person how their commission was calculated.

SUMMARY OF THE INVENTION

Embodiments of the invention include systems and methods of allocating transactions among a number of business objects. These business objects include, for example, individuals and/or organizations. The transactions typically involve payment of funds, such as sales commissions, but may also include allocation of inventory, movement of goods, or the like, as discussed further herein. Allocation is accomplished using predefined rules stored in a hierarchical data structure that is based on relationships between the business objects. The predefined rules and hierarchical data structure are used to form generated allocation rules associated with the business objects. The generated allocation rules are, in turn, used for allocating the transactions among the business objects. Each of the allocated transactions includes characteristics that can be determined to satisfy or not to satisfy a generated allocation rule. For example, in some embodiments, the business objects include individuals and groups within a company, the hierarchical data structure is based on the company organization and the generated allocation rules are used to determine sales commissions earned by each business object.

Various embodiments of the invention include transaction filtering system for allocating transactions among a plurality of business objects, the system comprising—storage configured to store generated allocation rules and to store transaction data associated with the plurality of transactions, each generated allocation rule being associated with at least one of the plurality of business objects and being generated using relationships between members of the plurality of business objects, and a query engine configured to query the transaction data using the generated allocation rules.

Various embodiments of the invention include a hierarchical data structure comprising a root node, one or more intermediate nodes related to the root node, one or more predefined rules, each predefined rule associated with a member of the one or more intermediate nodes, a leaf node, and a generated allocation rule associated with the leaf node and configured for use in determining allocation of transactions to a business object associated with the leaf node, the generated allocation rule including a member of the one or more predefined rules inherited from the one or more intermediate nodes.

Various embodiments of the invention include a computing system for hierarchical transaction filtering, the computing system comprising storage configured to store a hierarchical data structure, a generated allocation rule, and transaction data, a rule generation engine configured to produce the generated allocation rule using data stored in the hierarchical data structure, and a query engine configured to query the transaction data using the generated allocation rule.

Various embodiments of the invention include a transaction allocation output comprising a set of transactions selected using a query, the query based on a generated allocation rule generated using a hierarchical data structure and associated with a leaf of the hierarchical data structure, at least two transactions of the set of transactions including—a transaction value, and a summation of the transaction values.

Various embodiments of the invention include a method of producing a generated allocation rule, the method comprising accessing a data structure including a root node, an intermediate node and a leaf node, reading the root node of the data structure, adding any predefined rule associated with the root node to the generated allocation rule, traversing the data structure to the intermediate node, reading the intermediate node, adding any predefined rule associated with the intermediate node to the generated allocation rule, traversing the data structure to the leaf node, adding any predefined rule associated with the leaf node to the generated allocation rule, and storing the generated allocation rule.

Various embodiments of the invention include a method of producing a plurality of generated allocation rules, the method comprising accessing a hierarchical data structure including a plurality of nodes, and traversing the plurality of nodes, at each node traversed, reading the traversed node, combining any predefined rule associated with the traversed node with any of the plurality of generated allocation rules inherited from a parent node, to produce another of the plurality of generated allocation rules, associating the another of the plurality of generated allocation rules with the traversed node, storing the another of the plurality of generated allocation rules, and determining if all leaf nodes have been traversed.

Various embodiments of the invention include a method of determining allocation of a plurality of transactions, the method comprising receiving first transaction data characterizing a first member of the plurality of transactions, receiving second transaction data characterizing a second member of the plurality of transactions, storing the first and second received transaction data, accessing a plurality of generated allocation rules, each of the plurality of generated allocation rules being associated with one of a plurality of business objects represented by an hierarchical data structure, executing a plurality of queries on the stored transaction data using a query engine, each of the plurality of queries being based on one of the plurality of generated allocation rules, and storing results of the executed queries.

Various embodiments of the invention include a method of generating a transaction allocation output, the method comprising receiving a query result including one or more transactions, the query result generated using a query, the query generated using a hierarchical data structure and the query associated with a leaf node of the hierarchical data structure, the query applied to a set of transactions, parsing each of the one or more transactions to determine a value of each of the one or more transactions, summing the values determined by parsing each of the one or more transactions, and including the sum of the determined values in the transaction allocation output.

Various embodiments of the invention include a system for determining allocation of a plurality of transactions among a plurality of business objects, the system comprising storage configured for storing transaction data characterizing the plurality of transactions, means for producing a plurality of generated allocation rules, using relationships between nodes of a data structure, means for executing a plurality of queries on the stored transaction data, using the plurality of generated allocation rules.

Various embodiments of the invention include a computer readable medium storing computer code for producing a generated allocation rule, the computer code comprising a code segment for accessing a data structure including a root node, an intermediate node and a leaf node, a code segment for reading the root node of the data structure, a code segment for adding any predefined rule associated with the root node to the generated allocation rule, a code segment for traversing the data structure to the intermediate node, a code segment for reading the intermediate node, a code segment for adding any predefined rule associated with the intermediate node to the generated allocation rule, a code segment for traversing the data structure to the leaf node, a code segment for adding any predefined rule associated with the leaf node to the generated allocation rule, and a code segment for storing the generated allocation rule.

Various embodiments of the invention include a method of producing a generated allocation rule, the method comprising accessing a data structure including a root node, an intermediate node and a leaf node, reading the root node of the data structure, adding any predefined rule associated with the root node to the generated allocation rule, traversing the data structure to the intermediate node, reading the intermediate node, adding any predefined rule associated with the intermediate node to the generated allocation rule, traversing the data structure from the intermediate node, reading the leaf node, adding any predefined rule associated with the leaf node to the generated allocation rule, and storing the generated allocation rule. In some of these embodiments, traversing the data structure from the intermediate node includes traversing the data structure to the leaf node. In some of these embodiments, traversing the data structure from the intermediate node includes traversing the data structure to the root node.

BRIEF DESCRIPTION OF THE VARIOUS VIEWS OF THE DRAWING

DISCLOSURE OF THE INVENTION

Figure 1:
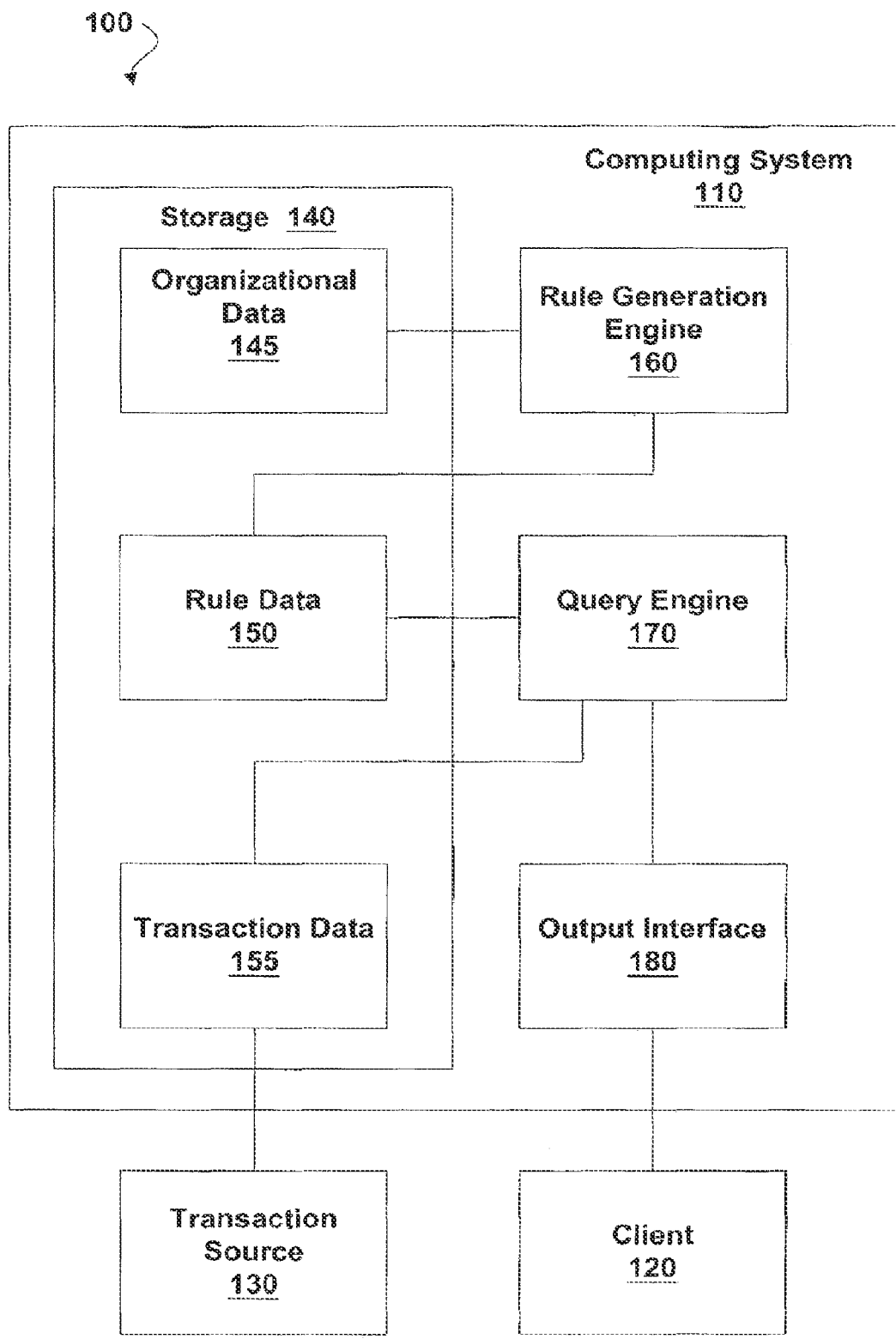
FIG. 1 illustrates a hierarchical transaction filtering system according to various embodiments of the invention.

Embodiments of the invention include systems and methods of generating allocation rules and using these generated allocation rules to allocate transactions, such as payment of sales commissions, among members of an organization. Each of these members are represented by a node in a hierarchical data structure and are optionally associated with some predefined rule (e.g., allocation criteria). Generated allocation rules, used for performing an allocation, are produced using the predefined rule and associations implied by the hierarchical data structure. For example, in some embodiments, each node in the hierarchical data structure is associated with a generated allocation rule produced by combining any associated predefined rule with a generated allocation rule inherited from a parent node. Through this process of inheritance and combination, a generated allocation rule is determined for each node in the hierarchical data structure. These generated allocation rules are then used to select transactions to be allocated to the members associated with the nodes of the hierarchical data structure.

In a typical embodiment, each member of an organization is treated as a business object associated with a node in the hierarchical data structure. Generated allocation rules, associated with the node and the business object, are derived through a process that includes combining any predefined rule characterizing the business object with any allocation rule (e.g., generated allocation rule) inherited from a parent node. Through inheritance of allocation rules, each node (other than a root node) is associated with a generated allocation rule that is an aggregation of the predefined rule associated with its parent nodes, and grandparent nodes, etcetera, in the hierarchical data structure. Generated allocation rules are produced as the hierarchical data structure is developed or by traversing the hierarchical data structure in an orderly manner. When a business object is not characterized by any predefined rule, the generated allocation rule associated with the business object, and corresponding node, is determined by inheritance from a parent node.

In a typical method of the invention, sales data are received and stored in a database as transactions to be allocated. In order to allocate these transactions among business objects, the database is queried using queries based on the generated allocation rules. Each query is used to select those transactions that satisfy the predefined rules included in a particular generated allocation rule and the selected transactions are allocated to a business object associated with that generated allocation rule. Thus, a particular person is allocated transactions whose characteristics match the generated allocation rule associated with that person, and the allocated transactions are selected using a query based on the associated generated allocation rule. Using this approach, a large number of transactions can be allocated using a small number of queries, because the number of queries is responsive to the number of business objects not the number of transactions. When the number of transactions significantly outnumbers the number of business objects, this approach is typically more efficient than individually comparing each transaction with a set of allocation rules.

In various embodiments, business objects include individual persons, groups, organizations, corporations, geographic locations, projects, products, production resources, tasks, or the like. In these embodiments, transactions optionally include sales, sales commissions, purchases, purchase costs, inventory allocation, allocation of financial resources, allocation of capital resources, tasks, steps in a process, compensation, quality control, billing or the like. For example, in one embodiment the business object is a task and the transaction is an inventory allocation to that task. In another embodiment, the business object is a person and the transaction is a task (e.g., a sales call) that can be assigned to a person. In another embodiment the business object is a shipping resource (e.g., a cargo carrier) and the transaction is a transportation task. In some embodiments, the transactions include sales and associated sales commissions, and the business objects include members of a sales team and associated parties. For the purposes of example, these embodiments will be discussed further herein. However, the methods and systems discussed in relation to these embodiments are readily applied to alternative embodiments of the invention including other types of business objects and transactions, without going beyond the intended scope of the invention.

In many businesses, sales are achieved as the result of a team effort involving sales personnel, marketing personnel, channel partners, sales engineers and managers. When a sale occurs, a commission or other credit is to be allocated among the parties who contributed to the sale. Typically, each party (e.g., business object) is associated with a generated allocation rule or set of generated allocation rules that determine if the party is entitled to an allocation from a particular sale. Each sale (e.g., transaction) is characterized by attributes that can be compared with the generated allocation rules. For example, a particular sales person may be associated with a generated allocation rule that specifies allocation of 2% of sales revenue within a particular geographic region, 1% of sales from a particular product line, 2% of sales to a particular customer, and 0.5% of sales by other members of her sales team. In this example, a transaction may be characterized by a geographic location, a product, a customer and a sales team. A wide variety of such allocation schemes are known in the art. In the invention, these schemes are expressed as generated allocation rules derived from a hierarchical data structure. Each condition, such as "2% of sales to a particular customer," is considered a predefined rule.

FIG. 1 illustrates a Transaction Filtering System 100 according to various embodiments of the invention. Transaction Filtering System 100 includes a Computing System 110 optionally accessible through a Client 120 and configured to receive transactions from a Transaction Source 130. Computing System 110 may be a single computing device or a set of interconnected computing devices. The set of interconnected computing devices optionally includes both local and remote devices. In typical embodiments, Client 120 includes a computing device such as a computer, personal digital assistant, network access device, or the like. Client 120 optionally accesses Computing System 110 though a network such as the Internet, local area network, wide area network, or the like. In some embodiments, Computing System 110 is accessed through a browser supported by Client 120.

Transaction Source 130 is a source of transactions to be allocated. For example, in various embodiments Transaction Source 130 is a point-of-sale system, an accounting system, a sales reporting system, an inventory system, a task management system, or the like. Transaction Source 130 is optionally supported by elements of Computing System 110. For example, in some embodiments Transaction Source 130 includes a sales accounting program executing on Computing System 110.

Figure 2:
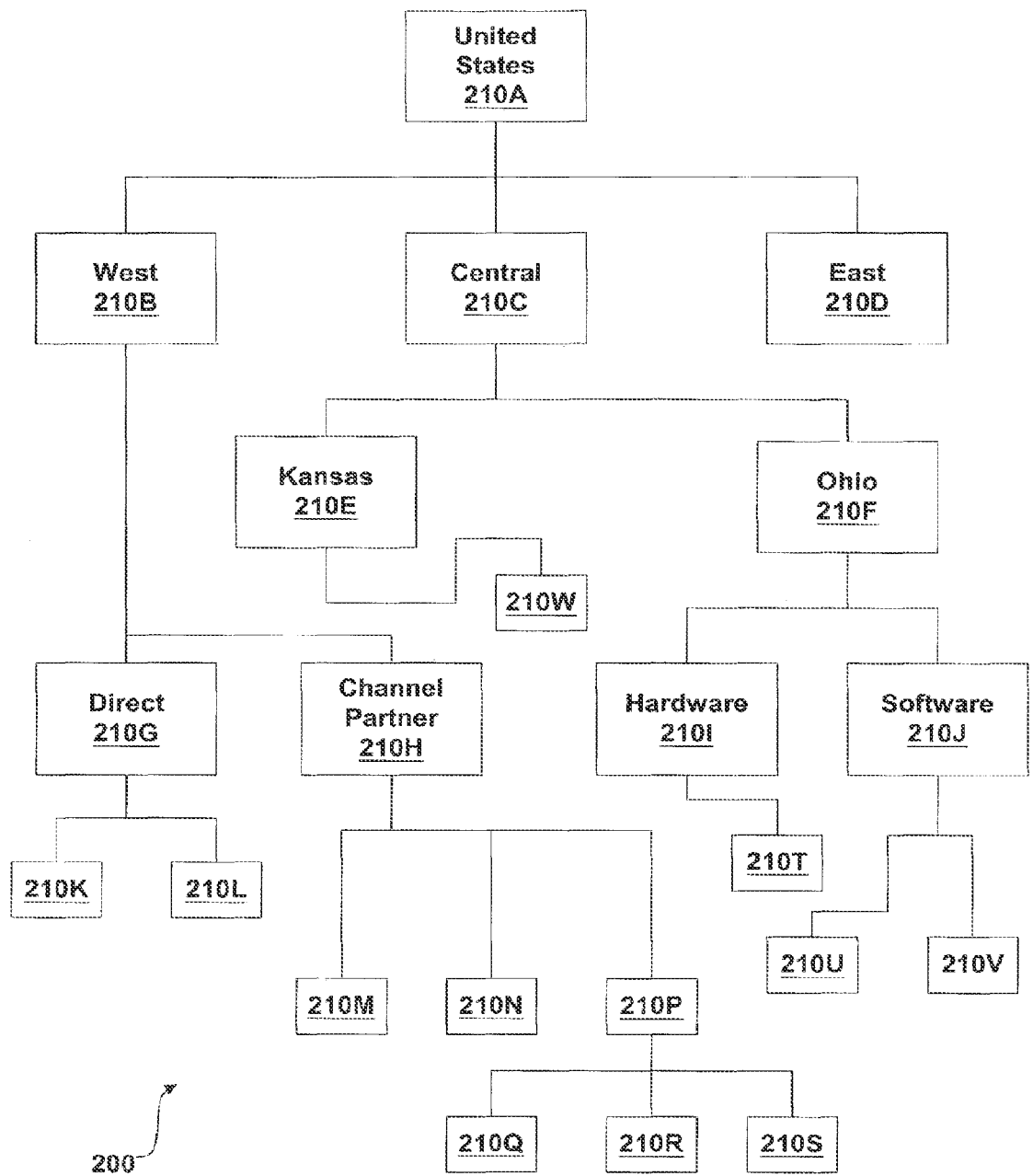
FIG. 2 illustrates hierarchical relationships between a set of business objects according to various embodiments of the invention.

Computing System 110 includes Storage 140 configured to store data associated with systems and methods of the invention. For example, Storage 140 is typically configured to store Organizational Data 145, Rule Data 150 and Transaction Data 155. Organizational Data 145 includes a hierarchical data structure configured to store relationships between business objects. An example of Organizational Data 145 is illustrated by FIG. 2 as discussed further herein. Rule Data 150 includes generated allocation rules associated with business objects characterized by information within Organizational Data 145. These generated allocation rules are produced using a Rule Generation Engine 160. The generation process is further described with reference to FIGS. 3 and 4. Transaction Data 155 includes transactions received from Transaction Source 130. In a typical embodiment a plurality of transactions are stored in Transaction Data 155.

A Query Engine 170 is configured to execute queries based on Rule Data 150. In a typical embodiment, each generated allocation rule within Rule Data 150 is processed to place the generated allocation rule in a structured query language (SQL) format. In some embodiments, the generated allocation rules are stored in Rule Data 150 as SQL queries and can be used by Query Engine 170 without modification. The generated allocation rule based queries are used to select transactions stored in Transaction Data 155.

Results of queries executed using Query Engine 170 are passed through an Output Interface 180 to generate a transaction allocation output that is optionally accessible to Client 120. Output Interface 180 is optionally configured to format the results in a report format including data such as a summation of selected transaction values. In some embodiments the transaction allocation output is generated in a meta-language format such as HTML, or the like.

FIG. 2 illustrates a Hierarchical Data Structure, generally designated 200, according to some embodiments of the invention. In these embodiments, Hierarchical Data Structure 200 is included in Organizational Data 145 (FIG. 1) and is used to store relationships between a set of Business Objects, 210A-210W. Business Objects 210A-210W include geographic regions (210A-210F), sales channel types (210G-210H), product types (210I-210J) individual sales people (210K-210W), or the like. In this example, Business Object 210A is represented by a root node of Hierarchical Data Structure 200. Business Objects 210B-210J and 210P are represented by intermediate nodes and Business Objects 210K-210N and 210Q-210W are represented by leaf nodes.

In some embodiments an individual sales person is optionally associated with more than one Business Object 210. For example, a sales person may be involved with both direct sales in the west and hardware sales in Ohio, and thus be both Business Objects 210K and 210T. A sales person is also optionally represented by an intermediate node such as Business Object 210P. The relationships between Business Object 210P (intermediate node) and Business Objects 210Q-210S (leaf nodes) may, for example, be that of sales group leader and sales group members. Some of Business Objects 210A-210W are optionally representative of different organizations (e.g., companies, divisions, or groups). For example, Business Objects 210M-210S may be representative of a separate channel partner company.

In a typical embodiment, each of Business Objects 210A-210W is associated with at least one generated allocation rule. These generated allocation rules are produced by Rule Generation Engine 160 (FIG. 1) using an inherited allocation rule and any predefined rule characterizing a particular member of Business Objects 210A-210W. For example, Business Object 210B inherits a generated allocation rule from Business Object 210A. In the illustrated example this generated allocation rule may be "a sale within the United States territory." In addition, Business Object 210B is characterized by a predefined rule "a sale within the West territory." The generated allocation rule associated with Business Object 210B may, therefore, be the combination of the inherited rule and the predefined rule, resulting in a generated allocation rule of "a sale within the United States territory and a sale within the West territory." Likewise, generated allocation rules for Business Objects 210G and 210H may be "a sale within the United States territory, a sale within the West territory and a direct sale" and "a sale within the United States territory, a sale within the West territory and a channel partner sale," respectively.

The embodiment of Hierarchical Relationship Structure 200 illustrated in FIG. 2 includes a single parent node for each node other than the root node (Business Object 210A). This structure simplifies inheritance of generated allocation rules from each parent node to each daughter node. However, in alternative embodiments any of Business Object 210B-210W may appear more than once in Organizational Data 145. In some embodiments a particular Business Object 210 inherits generated allocation rules from more than one parent node. The inheritance approach to production of generated allocation rules, as employed by Rule Generation Engine 160, is possible as long as there are a finite number of paths between each node and the root node, (i.e., no circular paths exist).

Thus, while a hierarchical data structure is disclosed for illustrative purposes, embodiments of the invention include other relational data models accommodating the principle of inheritance. In some embodiments of the invention, not all nodes are associated with a member of Business Objects 210A-210W. For example, some data structures, such as a binary tree representation of Hierarchical Data Structure 200, include nodes used primarily for navigation. In some embodiments, only leaf nodes are associated with a member of Business Objects 210A-210W and intermediate nodes are used for navigating the data structure. Even when not associated with a member of Business Objects 210A-210W, a node may optionally be associated with a predefined allocation rule.

Figure 3:
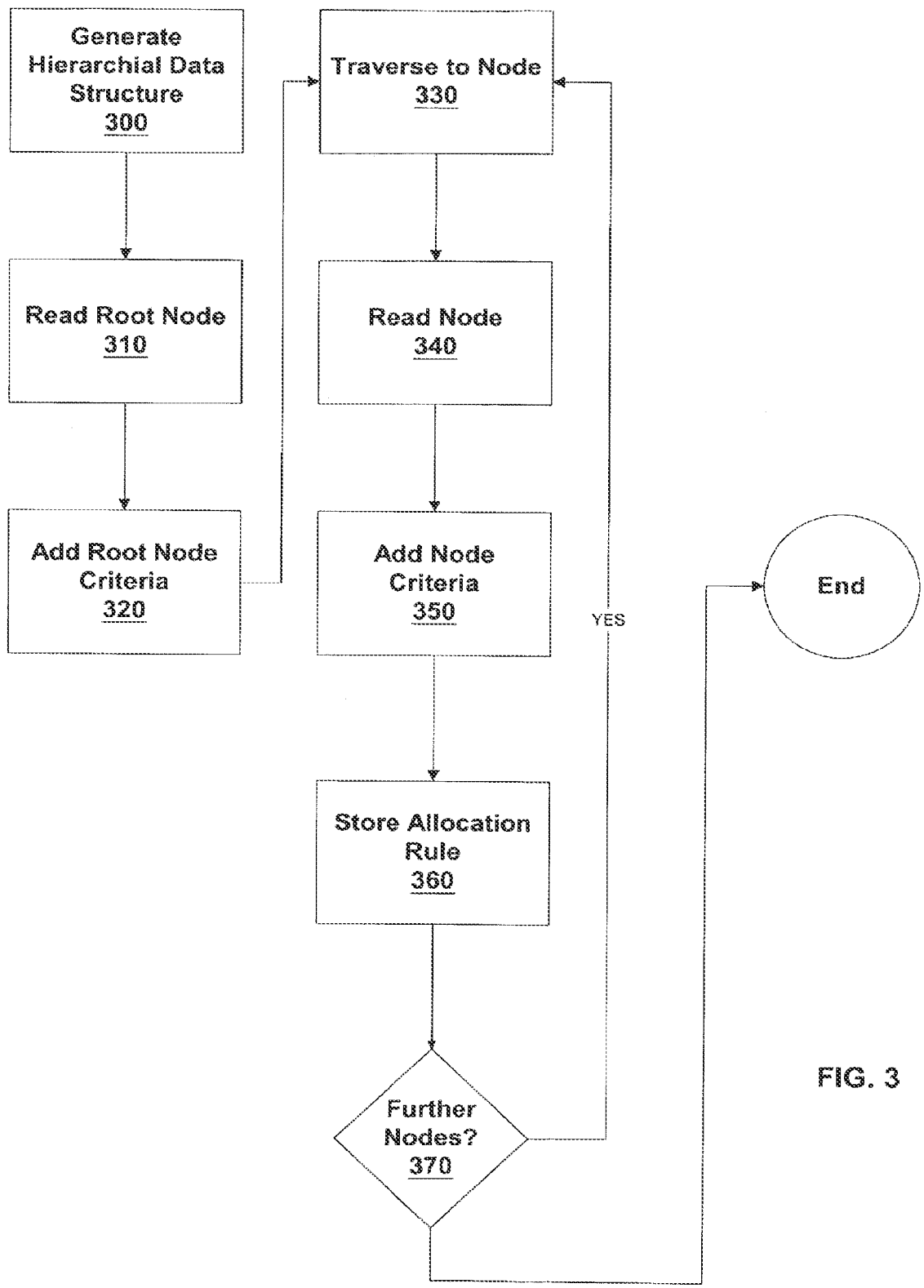
FIG. 3 illustrates a method of determining a generated allocation rule according to various embodiments of the invention.

FIG. 3 illustrates a method of determining a generated allocation rule according to various embodiments of the invention. In an optional Generate Hierarchical Data Structure Step 300, Organizational Data 145, such as that illustrated in FIG. 2 is generated and stored in Storage 140. This step includes establishing hierarchical relationships between Business Objects 210A-210W and/or defining predefined rules characterizing Business Objects 210A-210W. This step may be avoided when previously existing data is used. Generate Hierarchical Data Structure Step 300 is optionally an ongoing process wherein Organizational Data 145 is updated by addition, deletion or other modification of Business Objects 210A-210W, over time.

In a Read Root Node Step 310, a root node of Hierarchical Data Structure 200 (e.g., the node representing Business Object 210A) is accessed using Rule Generation Engine 160. From this node all the nodes within Organizational Data 145 are accessible. In some embodiments, this access includes passing a pointer referencing a memory location wherein Business Object 210A is stored, to Rule Generation Engine 160. Read Root Node Step 310 typically includes reading any predefined rule characterizing Business Object 210A.

In an Add Root Node Criteria Step 320, any predefined rule characterizing Business Object 210A is added to the allocation rule being generated. The result of this addition is a generated allocation rule, for the root node, and associated with Business Object 210A. After this step, the generated allocation rule associated with Business Object 210A may include only the predefined rule characterizing Business Object 210A, or alternatively, may also include default a predefined rule introduced by Rule Generation Engine 160. This predefined rule may include, for example, filtering criteria based on the characteristics of the transaction (such as sales amount), or characteristics of the business object (such as product cost).

In a Traverse to Node Step 330, Hierarchical Data Structure 200 is traversed to another node representing one of Business Objects 210B-210W. Traversal of Organizational Data 145 is typically accomplished using one of the many algorithms known in the art for navigating a data structure. Once Rule Generation Engine 160 traverses to a node within Organizational Data 145 that node is considered the "current" node upon which Rule Generation Engine 160 performs operations. In Read Node Step 340, any predefined rule associated with the current node is read by Rule Generation Engine 160.

In an Add Node Criteria Step 350 the read predefined rule is added to any generated allocation rule inherited from a parent node of the current node. Typically, each node other than the root node has one parent node from which a generated allocation rule is inherited. The combination of the inherited generated allocation rule and the read predefined rule forms a generated allocation rule for the current node and any associated member of Business Objects 210B-210W. In alternative embodiments, a node may inherit allocation rules from more than one parent node. In these embodiments, the generated allocation rule for the current node is the combination of all inherited allocation rules and any read predefined rules.

In a Store Allocation Rule Step 360, the generated allocation rule associated with the node is stored in Rule Data 150 (FIG. 1). The storage is optionally in a format accessible to Query Engine 170. In some embodiments, Query Engine 170 is configured to generate a query based on each of the stored rules and in other embodiments the rules are stored directly as formatted queries. In alternative embodiments, the generated allocation rules are stored in Rule Data 150 after each rule is completed.

As determined in a Step 370, if there are further nodes, that have not been read using Read Node Step 340, then the method returns to Traverse to Node Step 330. This process is typically repeated until all nodes have been visited.

Figure 4:
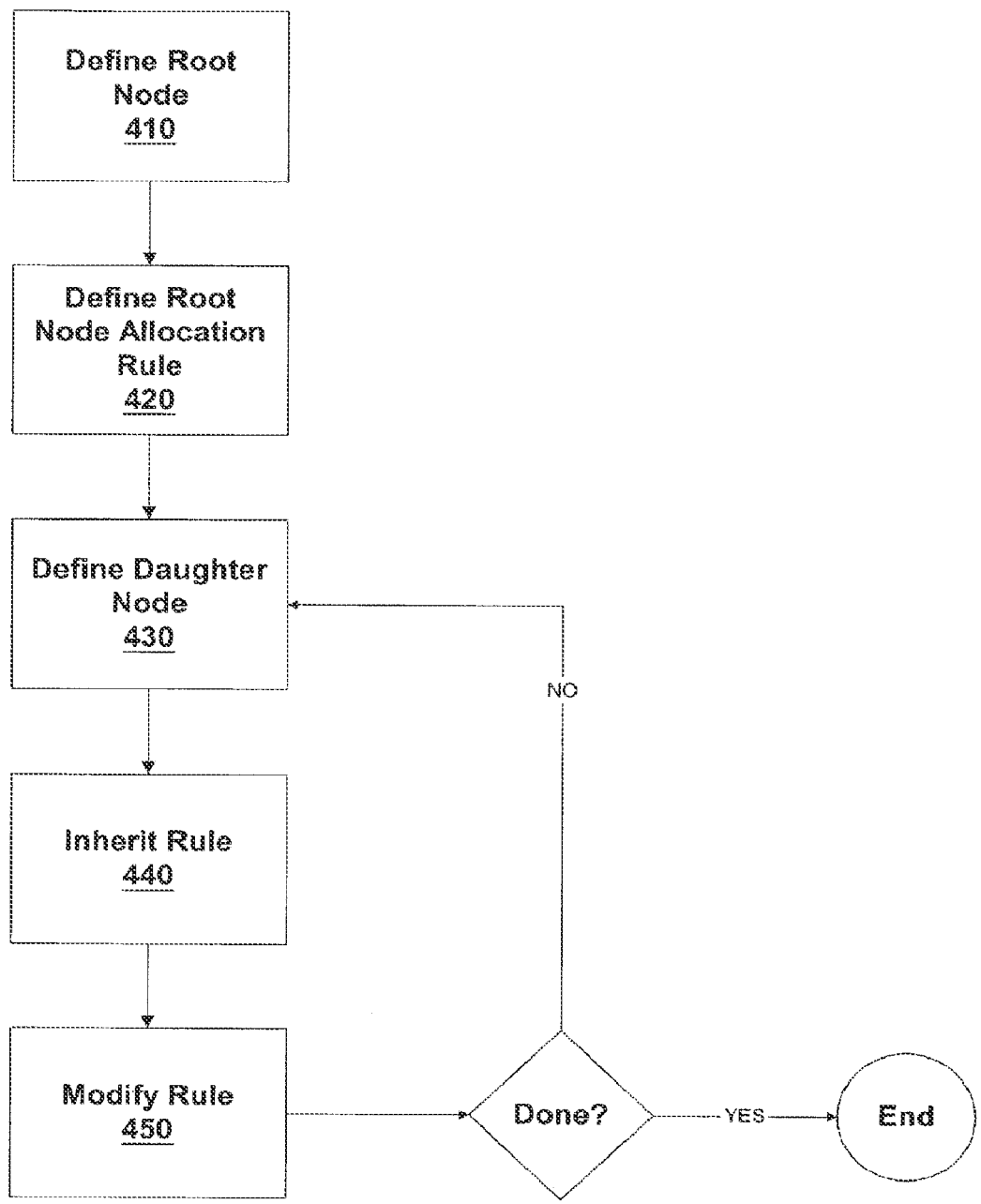
FIG. 4 illustrates an alternative method of determining a generated allocation rule according to various embodiments of the invention.

FIG. 4 illustrates an alternative method of determining a generated allocation rule according to various embodiments of the invention. In this embodiment, generated allocation rules are produced during development of Hierarchical Data Structure 200. In a Define Root Node Step 410, a root node associated with Business Object 210A is defined. This node serves as a root for Hierarchical Data Structure 200, including nodes associated with Business Objects 210A-210W. Define Root Node Step 410 optionally includes specification of a predefined rule characterizing Business Object 210A.

In an optional Define Root Node Allocation Rule Step 420, Rule Generation Engine 160 is used to define a generated allocation rule associated with the root node. The generated allocation rule is produced by combining any default rule received from Rule Generation Engine 160 with any predefined rule specified in Define Root Node Step 410.

In a Define Daughter Node Step 430, a daughter node, optionally associated with a member of Business Objects 210B-210W, is defined. The daughter node may be either an intermediate node or a leaf node. The first time Define Daughter Node Step 430 is executed the defined node will be a daughter of the root node. In subsequent executions, the defined node may be a daughter of either the root node or an intermediate node. Define Daughter Node Step 430 optionally includes specification of a predefined rule characterizing a member of Business Objects 210B-210W associated with the defined daughter node.

In an Inherit Rule Step 440, the daughter node, defined in Define Daughter Node Step 430, inherits a generated allocation rule from its parent node. In alternative embodiments, the daughter node has more than one parent node and optionally inherits a generated allocation rule from each parent node.

In a Modify Rule Step 450, the inherited allocation rule is modified by adding any predefined rule characterizing the member of Business Objects 210B-210W associated with the defined daughter node. The result of this addition is a new generated allocation rule associated with the daughter node. Steps 430 through 450 are repeated as needed as new nodes and associated Business Objects 210B-210W are added to Hierarchical Data Structure 200.

The methods illustrated in FIG. 3 and FIG. 4 are optionally both used in the same embodiments of the invention. For example, in some embodiments the method illustrated by FIG. 4 is used when Hierarchical Data Structure 200 is first developed and the method illustrated by FIG. 3 is used to update generated allocation rules if Hierarchical Data Structure 200 has been modified. This modification optionally includes, for example, addition or deletion of nodes, changes in predefined rules, changes in associations between nodes and/or Business Objects 210A-210W, or the like. In various embodiments, data generated in Define Root Node Step 410 and Define Daughter Node Step 430 are stored in Organizational Data 145 (FIG. 1), while data generated in Define Root Node Allocation Rule Step 420 and Modify Rule Step 450 are stored in Rule Data 150.

Figure 5:
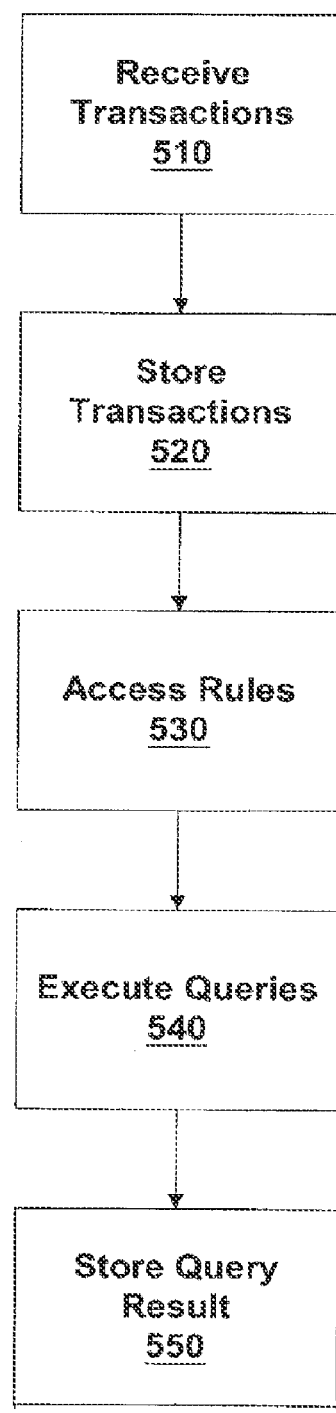
FIG. 5 illustrates a method of allocating a plurality of transactions according to various embodiments of the invention.

FIG. 5 illustrates a method of allocating a plurality of transactions according to various embodiments of the invention. In a Receive Transactions Step 510 transaction data characterizing transactions are received from Transaction Source 130 (FIG. 1). For example, in some embodiments Transaction Source 130 includes records of sales entered by individual sales personnel or their managers. In a Store Transactions Step 520, the transactions received in Receive Transactions Step 510 are stored in Storage 140 as Transaction Data 155. In some embodiments, this storage is accomplished using an SQL compatible database. Typically, a number of transactions are stored before completion of Receive Transactions Step 510 and Store Transactions Step 520. In some embodiments, because the number of queries made to allocate the stored transactions is based upon the number of generated allocation rules used for allocating those transactions, rather than upon the number of transactions, further benefit is achieved when the number of transactions is greater than the number of generated allocation rules.

In an Access Rules Step 530, Query Engine 170 is used to access Rule Data 150 and the generated allocation rules stored therein. The accessed generated allocation rules include those generated allocation rules produced using Organizational Data 145 and Rule Generation Engine 160. In an Execute Queries Step 540, Query Engine 170 is used to perform queries on the transactions received in Receive Transactions Step 510. These queries are based on the generated allocation rules accessed in Access Rules Step 530. In some embodiments, the generated allocation rules are retrieved in a query format, such as SQL, while in other embodiments the generated allocation rules are formatted in Execute Queries Step 540 to form queries for execution. In some embodiments, a query is executed for each generated allocation rule. In some embodiments, a query is executed for each generated allocation rule associated with a leaf node. For example, in embodiments of Hierarchical Data Structure 200, wherein only leaf nodes are used to represent Business Objects 210A-210W, only the generated allocation rules associated with these leaf nodes are needed for allocation.

In an optional Store Query Result Step 550, results of queries executed in Execute Queries Step 540 are stored. Storage may occur on Storage 140, Client 120, or another computing device. Typically, the query results include those transactions that match the generated allocation rules associated with each of Business Objects 210A-210W. Each query executed in Execute Queries Step 540 serves to select transactions to be allocated to a member of Business Objects 210A-210W. In some embodiments, a transaction can be allocated to more than one member of Business Objects 210A-210W.

In the method illustrated by FIG. 5, transactions are optionally allocated in separate stages. For example, in one embodiment wherein Business Object (Channel Partner) 210H (FIG. 2) is a separate company, a benefit is achieved by allocating transactions to Business Object 210H and then allowing the separate company to allocate these transactions among Business Objects 210M-210S in a separate stage. Thus, each allocation is optionally viewed as a Transaction Source 130 to a separate stage of the invention. In one embodiment, the generated allocation rules used to allocate transactions to Business Object 210H are not revealed to Business Object 210H. Furthermore, in one embodiment, only transactions allocated to Business Object 210H are revealed to Business Object 210H.

Figure 6:
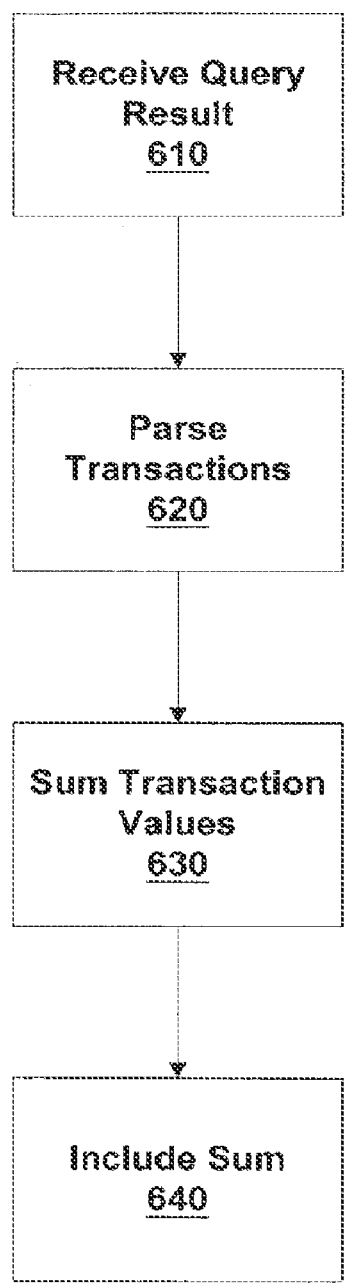
FIG. 6 illustrates a method of generating a transaction allocation output according to various embodiment of the invention.

FIG. 6 illustrates a method of generating a transaction allocation output according to various embodiment of the invention. In a Receive Query Result Step 610 a query result, including selected transactions, is received. This query result is, for example, a query result stored in Store Query Result Step 550 of FIG. 5. The received query result is generated using a query based on a hierarchical organizational data (e.g., Hierarchical Data Structure 200). Examples of steps included in this generation process are illustrated by FIG. 3 and FIG. 4.

In a Parse Transactions Step 620, the selected transactions received in Receive Query Result Step 610 are parsed. During the parsing process transaction values are identified. In various embodiments, these transaction values are, for example, the amount of a sale, the amount of a sales commission, the amount paid by a customer, the cost of a sale, an inventory allocation, or the like.

In a Sum Transaction Values Step 630 the transaction values identified in Parse Transactions Step 620 are summed. In alternative embodiments alternative or additional mathematical operations are performed on these transaction values. In an Include Sum Step 640, the result of the mathematical operation, performed in Sum Transactions Values Step 630, are included in the transaction allocation output. In various embodiments of the invention, the transaction allocation output is a printed output, a display output, a digital electronic output, a saved output, or the like. For example, in some embodiments, the transaction allocation output is displayed and/or printed using Client 120.

Several embodiments are specifically illustrated and/or described herein. However, it will be appreciated that modifications and variations are covered by the above teachings and within the scope of the appended claims without departing from the spirit and intended scope thereof. For example, the various computer systems described herein are optionally implemented as distributed systems; likewise the location of specific data records is optionally varied among a variety of alternative locations. Communication between various elements of the invention may occur over the World Wide Web or other computer network. The invention is optionally implemented as an Internet application.

The invention is optionally adapted to alternative types of ordered data structures that allow inheritance between nodes. For example, some embodiments include a data structure wherein only leaf nodes are associated with Business Objects 210A-210W. In some embodiments, generated allocation rules are only determined for leaf nodes. In some embodiments, a generated allocation rule can be empty (e.g., no allocation rule is inherited or predefined) and, in some embodiments, the systems and methods of the invention are used to update existing allocation rules. In some embodiments, a generated allocation rule is determined by traversing hierarchical Data Structure 200 from a leaf node, to an intermediate node, and then to the root node. In these embodiments, the generated allocation rule is generated by collecting predefined rules associated with traversed nodes. Embodiments of the invention include computer code stored on a computer readable medium and configured to execute methods of the invention.

In this application "allocation rules" are meant to include both rules used to select a business object to receive an allocation resulting from a transaction and rules used to calculate the amount of the allocation. In some embodiments an allocation of all or part of a transaction to a business object is treated as a new transaction. For example, the payment of a commission, once determined, is optionally managed as a new transaction.

What is claimed is:

1. A method of determining allocation of a plurality of transactions, the method comprising:
receiving first transaction data characterizing a first member of a plurality of transactions;
receiving second transaction data characterizing a second member of the plurality of transactions;
storing the first and second received transaction data;
accessing a plurality of generated allocation rules, each of the plurality of generated allocation rules being associated with one of a plurality of business objects represented by an hierarchical data structure;
executing, using at least one processor operatively coupled with a memory, a plurality of queries on the stored transaction data by placing at least one of the generated allocation rules in a structured query language (SQL) query and generating a set of query results based on the SQL query, each of the plurality of queries being based on one of the plurality of generated allocation rules; and
storing results of the executed queries.

2. The method of claim 1, wherein a member of the plurality of transactions is a sale and the queries are configured to determine commission allocations.

3. The method of claim 1, wherein the generated allocation rules include commission allocation rules and the executing retrieves the commission allocation rules directly as the SQL query.

4. The method of claim 1, wherein the generated allocation rules include a predefined commission allocation rule inherited from a parent node.

5. The method of claim 1, wherein the stored results characterize allocation of the transactions to the business objects, the allocation to each business object being responsive to transactions returned by the query associated with that business object.

6. The method of claim 1, further including receiving additional transaction data characterizing further members of the plurality of transactions, a number of the transactions allocated being greater than a number of generated allocation rules.

7. The method of claim 1, further including allocating the plurality of transactions responsive to the results of the queries.

8. The method of claim 1 wherein each operation is performed by the at least one processor operatively coupled with the memory.

9. A machine-readable tangible storage medium embodying information indicative of instructions for causing one or more machines to perform the operations of claim 1.

10. A computer system executing instructions in a computer program, the computer program instructions comprising program code for performing the operations of claim 1.

11. A machine-readable tangible storage medium embodying information indicative of instructions for causing one or more machines to perform operations comprising:
receiving first transaction data characterizing a first member of a plurality of transactions;
receiving second transaction data characterizing a second member of the plurality of transactions;
storing the first and second received transaction data;
accessing a plurality of generated allocation rules, each of the plurality of generated allocation rules being associated with one of a plurality of business objects represented by an hierarchical data structure;

executing a plurality of queries on the stored transaction data by placing at least one of the generated allocation rules in a structured query language (SQL) query and generating a set of query results based on the SQL query, each of the plurality of queries being based on one of the plurality of generated allocation rules; and storing results of the executed queries.

12. A method of generating a transaction allocation output, the method comprising:

receiving a query result including one or more transactions, the query result generated using a query, the query generated in a structured query language (SQL) using a hierarchical data structure and the query associated with a leaf node of the hierarchical data structure, the query applied to a set of transactions;

parsing, using at least one processor operatively coupled with a memory, each of the one or more transactions to determine a value of each of the one or more transactions;

summing the values determined by parsing each of the one or more transactions; and including the sum of the determined values in the transaction allocation output.

13. The method of claim 12, wherein the one or more transactions include a sales commission.

14. The method of claim 12, wherein the one or more transactions include a purchase cost.

15. The method of claim 12, wherein the one or more transactions include an inventory allocation.

16. The method of claim 12, wherein the one or more transactions include a resource allocation.

17. The method of claim 12, wherein the one or more transactions include assignment of a task.

18. The method of claim 12 wherein each operation is performed by the at least one processor operatively coupled with the memory.

19. A machine-readable tangible storage medium embodying information indicative of instructions for causing one or more machines to perform the operations of claim 12.

20. A computer system executing instructions in a computer program, the computer program instructions comprising program code for performing the operations of claim 12.

* * * * *

UNITED STATES PATENT AND TRADEMARK OFFICE
CERTIFICATE OF CORRECTION

PATENT NO. : 8,234,197 B2
APPLICATION NO. : 13/092782
DATED : July 31, 2012
INVENTOR(S) : Solberg et al.

Page 1 of 1

It is certified that error appears in the above-identified patent and that said Letters Patent is hereby corrected as shown below:

In column 7, line 14, delete "(2101-2104" and insert -- (210I-210J), --, therefor.

In column 7, line 32, delete "210M-2105" and insert -- 210M-210S --, therefor.

In column 7, line 40, delete "21013" and insert -- 210B --, therefor.

Signed and Sealed this
Twenty-third Day of October, 2012

David J. Kappos
*Director of the United States Patent and Trademark Office*